Patented Aug. 24, 1954

2,687,434

UNITED STATES PATENT OFFICE 2,687,434

PRODUCTION OF 1-(NITROPHENYL)-2
ACYLAMIDOPROPANE-1,3-DIOLS

Loren M. Long, Grosse Pointe Woods, Mich., assignor to Parke, Davis & Company, Detroit, Mich., a corporation of Michigan No Drawing. Application January 26, 1953,
Serial No. 333,379

10 Claims. (Cl. 260—562)

This invention relates to a process for producing 1 - p - nitrophenyl -2- acylamidopropane-1,3-diols. More particularly, the invention relates to an improved process for producing threo-1-p-nitrophenyl-2-acylamidopropane-1,3-diols from p-nitro-α-acylamido-β-hydroxypropiophenones.

1-p-nitrophenyl-2-acylamidopropane-1,3- diols having the threo diastereoisomeric form are important therapeutic products or intermediates for the production of therapeutic products. Chloramphenicol and its optical racemate are two examples of the many therapeutic products of this type while DL-threo-1-p-nitrophenyl-2-acetamidopropane - 1,3 - diol and DL-threo-1-p-nitrophenyl-2-benzamidopropane-1,3-diol are two examples of the many compounds in this class which are important intermediates for the production of chloramphenicol and related therapeutic substances. A great many processes have been proposed for producing the threo-1-p-nitrophenyl-2-acylamidopropane-1,3-diols. Many of these processes are, of course, of only theoretical interest. Of the processes of commercial interest or in commercial practice, the process which involves the reduction of p-nitro-α-acylamido-β-hydroxypropiophenones with an oxidizable aluminum alkoxide in an anhydrous organic solvent is perhaps the most practical and important. [Long et al., Journal of the American Chemical Society, volume 71, pages 2473–2475 (1949); ibid., volume 73, pages 481–482 (1951)]. Although this process produces a mixture of diastereoisomers which is primarily composed of the desired threo diastereoisomer, the yield of this component is, for some unexplainable reason, never greater than 50% of the theoretical and is usually in the range of 40 to 45% of the theoretical. Moreover, even though only small amounts of the erythro diastereoisomer are produced in the process some processing is usually required to purify the reduction product and this, of course, is undesirable.

It is an object of the invention to provide a method for obtaining high yields of the threo-1-p-nitrophenyl-2-acylamidopropane-1,3-diols by the reduction of p-nitro-α-acylamido-β-hydroxypropiophenones with an oxidizable aluminum alkoxide in an anhydrous organic solvent.

Another object of the invention is to provide a method for carrying out the reduction of p-nitro-α-acylamido-β-hydroxypropiophenones with an oxidizable aluminum alkoxide to obtain threo-1-p-nitrophenyl - 2 - acylamidopropane - 1,3 - diols which contain little or none of the erythro diastereoisomer.

These and other objects which will appear hereinafter are realized by carrying out the reduction of p-nitro-α-acylamido-β-hydroxypropiophenones with an oxidizable aluminum alkoxide in an anhydrous organic solvent in the presence of an aluminum halide, preferably aluminum chloride or aluminum bromide. Carrying out the reaction in the presence of an aluminum halide results in a 10 to 40% increase in yield over the best yield obtainable without the use of an aluminum halide catalyst. So far as it has been possible to determine, none or practically none of the erythro-1-p-nitrophenyl-2-acylamidopropane-1,3-diol is produced when an aluminum halide catalyst is employed in the process.

In carrying out the process of the present invention, about 0.05 to 0.2 mole of the aluminum halide is employed for each mole of the p-nitro-α-acylamido-β-hydroxypropiophenone to be reduced. In general, the preferred quantity of the aluminum halide is about 0.1 to 0.15 mole for each mole of the ketonic compound to be reduced. The yield of the threo-1-p-nitrophenyl-2-acylamidopropane-1,3-diol obtained when using this preferred quantity of aluminum halide is generally 30 to 40% greater than the best yield obtainable without the use of a catalyst. When 0.05 mole of aluminum halide per mole of ketonic compound is employed the yield is about 10% greater than that obatined without the use of a catalyst. More than 0.2 mole of the aluminum halide per mole of the ketonic compound can be employed, if desired, but this is uneconomical because such larger amounts of catalyst do not appear to increase the yield. The following table illustrates the effect of the catalyst and the relative quantity thereof on the yield obtained in the reduction of p-nitro-α-acylamido-β-hydroxypropiophenones with oxidizable aluminum alkoxides.

| Amount of (dl)-p-nitro-α-acetamido-β-hydroxy-propiophenone to be reduced | | Amount of Aluminum Isopropylate Used | | cc. of Isopropanol (Solvent) | Amount of Aluminum Chloride (Catalyst) | | Yield of DL-threo-1-p-nitrophenyl-2-acetamidopropane-1,3-diol | |
| --- | --- | --- | --- | --- | --- | --- | --- | --- |
| Grams | Moles | Grams | Moles | | Grams | Moles | Grams | Percent |
| | | | | Ml. | | | | |
| 15.12 | 0.06 | 18.36 | 0.09 | 210 | 0 | 0 | 6.2 | 40.5 |
| 15.12 | 0.06 | 18.36 | 0.09 | 230 | 0 | 0 | 6.8 | 44.5 |
| 50.4 | 0.2 | 61.2 | 0.3 | 500 | 0 | 0 | 25 | 49.2 |
| 50.4 | 0.2 | 40.8 | 0.2 | ¹ 500 | 0 | 0 | 13.5 | 26.8 |
| 50.4 | 0.2 | 45 | 0.22 | 500 | 1.34 | 0.01 | 27.5 | 54.5 |
| 50.4 | 0.2 | 45 | 0.22 | 500 | 2.67 | 0.02 | 32.6 | 64 |
| 51 | | 51 | | 300 | 2.67 | 0.02 | 34 | 66 |
| 50.4 | 0.2 | 45 | | 500 | 3 | | 35 | 68.7 |
| 50.4 | 0.2 | 61.2 | 0.3 | 500 | 4.0 | 0.03 | 36 | 70.8 |
| 50.4 | 0.2 | 40.8 | 0.2 | 500 | 5.3 | 0.04 | 35.5 | 69.8 |
| 50.4 | 0.2 | 61.2 | 0.3 | 500 | 13.4 | 0.1 | 35.4 | 69.7 |
| 50.4 | 0.2 | 45 | 0.22 | 500 | ² 6.34 | ² 0.02 | 31.3 | 61.6 |

¹ Plus 250 cc. of toluene.
² AlBr₃ rather than AlCl₃.

The reaction can be carried out under a variety of conditions. The organic solvent used as the reaction medium is usually a lower aliphatic alcohol and, preferably, the one corresponding to the alkoxide. The use of alkoxides of secondary alcohols such as isopropanol and secondary butyl alcohol is preferred since these alkoxides are more readily oxidized and hence milder reaction conditions can be employed. In general, the reaction can be effected over a wide temperature range, but for most purposes a temperature between about 20 and 125° C. is preferred. Similarly, the amount of the oxidizable aluminum alkoxide in relationship to the quantity of the ketonic compound to be reduced can be varied within rather large limits. In most cases, it is seldom necessary to employ more than about three equivalents of the alkoxide but, if desired, as little as one equivalent to as much as twenty or thirty equivalents can be used. When using an alkoxide derived from a secondary aliphatic alcohol in a solvent of the alcohol corresponding to the alkoxide, the preferred method of bringing about the reaction is to reflux the reaction mixture containing one or slightly more equivalents of the aluminum alkoxide and to distill off the oxidized alcohol (a lower aliphatic ketone) as it is formed in the reaction mixture.

The process of the invention is generally applicable to the p-nitro-α-acylamido-β-hydroxypropiophenones and is not dependent upon the nature of the carboxylic acid acyl group present in the ketonic starting material. For example p-nitro-α-acylamido-β-hydroxypropiophenones in which the acyl group is derived from lower aliphatic carboxylic acids, halogenated lower aliphatic carboxylic acids, alkoxy lower aliphatic carboxylic acids, benzoic acid, benzoic acids containing alkyl, alkoxy, halogen or nitro substituents and the like can be used as starting materials in the process. Similarly, the optical configuration of the ketonic starting materials is not affected by the reduction and, consequently, one can produce the optically active acylamido diols by utilizing an optically active ketonic compound as the starting material. It is, therefore, to be understood that, in the absence of a designation to the contrary, the chemical names used in this specification and claims are to be interpreted in their generic sense, that is, as including the individual optical isomers as well as the racemic, modification of the ketonic starting materials and final products.

The invention is illustrated by the following examples.

*Example 1*

50.4 g. of (dl)-p-nitro-α-acetamido-β-hydroxy propiophenone is added portionwise with stirring over a period of fifty minutes to a refluxing solution consisting of 61.2 g. of aluminum isopropylate, 4 g. of anhydrous aluminum chloride and 500 cc. of anhydrous isopropanol. The yellow solution gradually becomes a dark red-brown color as the addition progresses. After the addition is completed the mixture is heated at reflux for one hour during which time the acetone is removed by distillation along with a small amount of the isopropanol. The mixture is cooled slightly, 80 cc. of water added and the resulting mixture stirred and refluxed for ten minutes. The hot mixture is filtered and the insoluble aluminum hydroxide extracted with two 250 cc. portions of hot 80% isopropanol and then with one 150 cc. portion of hot isopropanol. The extracts are combined with the reaction mixture filtrate and the water and isopropanol removed by distillation in vacuo. The dry residue is ground up and refluxed for a few minutes with 200 cc. of ethyl acetate. The hot ethyl acetate mixture is cooled and the crystalline DL-threo-1-p-nitrophenyl-2-acetamidopropane-1,3-diol collected and dried; yield 36 g., 70.8%; M. P. 164–6° C.

When the above procedure is followed omitting the 4 g. of anhydrous aluminum chloride the yield is only 49.2%.

*Example 2*

64.2 g. of (dl)-p-nitro-α-dichloroacetamido-β-hydroxypropiophenone is added gradually with stirring to a refluxing solution composed of 61.2 g. of aluminum isopropylate dissolved in 1000 cc. of anhydrous isopropanol. The mixture is refluxed for a total of three hours during which time a small amount of the reaction mixture is removed by distillation. 200 cc. of water is added to the hot solution, the mixture refluxed for fifteen minutes and then filtered while hot. The residue is extracted with one liter of hot 80% isopropanol and the filtrate and extract combined. The solvents are removed from the solution by distillation in vacuo and the residue stirred with 300 cc. of hot ethyl acetate. The ethyl acetate mixture is cooled and the crystalline DL-threo-1-p-nitrophenyl-2-dichloroacetamidopropane-1,3-diol collected; M. P. 152° C.; yield, 24 g., 37%.

If 4 g. of anhydrous aluminum chloride is added to the aluminum isopropylate solution in the above procedure one obtains 42.2 g. of DL-threo-1-p-nitrophenyl-2-dichloroacetamidopropane-1,3-diol rather than 24 g. The percentage yield is increased from 37% to 65%.

*Example 3*

50.4 g. of (*dl*)-p-nitro-α-acetamido-β-hydroxypropiophenone is added slowly to a refluxing mixture composed of 45 g. of aluminum isopropylate, 6.34 g. of anhydrous aluminum bromide and 500 cc. of anhydrous isopropanol. The reaction mixture is heated and stirred for two hours during which time approximately 200 cc. of distillate is collected. 80 cc. of water is added to the hot reaction mixture and the reaction mixture refluxed for fifteen minutes. The hot mixture is filtered and the residue washed with two 250 cc. portions of hot 80% isopropanol. The filtrate and washings are combined and the solvents removed by distillation in vacuo. The residual yellow solid is warmed with about 200 cc. of ethyl acetate, the mixture coled and the crystalline DL-threo-1-p - nitrophenyl - 2 - acetamidopropane - 1,3-diol collected; M. P. 164–6° C.; yield, 31.3 g., 61.5%.

When the above procedure is carried out in the absence of aluminum bromide, the yield of the DL - threo - 1 - p - nitrophenyl - 2 - acetamido-propane-1,3 diol is only 49.2%.

What I claim is:

1. In a process for the production of threo-1-p-nitrophenyl-2-acylamidopropane-1,3 - diols by the reduction of p-nitro-α-acylamido-β-hydroxypropiophenones with an oxidizable aluminum alkoxide in an anhydrous organic solvent, the improvement which comprises carrying out the reduction in the presence of an aluminum halide.

2. Process according to claim 1 wherein 0.05 to 0.2 mole of aluminum halide is employed for each mole of the p-nitro-α-acylamido-β-hydroxypropiophenone to be reduced.

3. In a process for the production of threo-1-p-nitrophenyl-2-acylamidopropane-1,3 - diols by the reduction of p-nitro-α-acylamido-β-hydroxypropiophenones with an oxidizable aluminum alkoxide in an anhydrous organic solvent, the improvement which comprises carrying out the reduction in the presence of 0.05 to 0.2 mole of aluminum chloride for each mole of p-nitro-α-acylamido-β-hydroxypropiophenone to be reduced.

4. In a process for the production of threo-1-p-nitrophenyl-2-acylamidopropane-1,3 - diols by the reduction of p-nitro-α-acylamido-β-hydroxypropiophenones with an oxidizable aluminum alkoxide in an anhydrous organic solvent, the improvement which comprises carrying out the reduction in the presence of 0.05 to 0.2 mole of aluminum bromide for each mole of the p-nitro-α-acylamido-β-hydroxypropiophenone to be reduced.

5. In a process for the production of DL-threo-1-p-nitrophenyl-2-acetamidopropane-1,3-diol by the reduction of (dl)-p-nitro-α-acetamido-β-hydroxypropiophenone with an oxidizable aluminum alkoxide in an anhydrous organic solvent, the improvement which comprises carrying out the reduction in the presence of 0.05 to 0.2 mole of aluminum chloride for each mole of the (dl)-p-nitro-α-acetamido-β-hydroxypropiophenone to be reduced.

6. In a process for the production of DL-threo-1-p-nitrophenyl-2-acetamidopropane-1,3-diol by the reduction of (dl)-p-nitro-α-acetamido-β-hydroxypropiophenone with an oxidizable aluminum alkoxide in an anhydrous organic solvent, the improvement which comprises carrying out the reduction in the presence of 0.05 to 0.2 mole of aluminum bromide for each mole of the (dl)-p-nitro-α-acetamido-β-hydroxypropiophenone to be reduced.

7. In a process for the production of DL-threo-1-p-nitrophenyl - 2 - dichloroacetamidopropane-1,3-diol by the reduction of (dl)-p-nitro-α-dichloroacetamido-β-hydroxypropiophenone with an oxidizable aluminum alkoxide in an anhydrous organic solvent, the improvement which comprises carrying out the reduction in the presence of 0.05 to 0.2 mole of aluminum chloride for each mole of the (dl)-p-nitro-α-dichloroacetamido-β-hydroxypropiophenone to be reduced.

8. In a process for the production of DL-threo-1-p-nitrophenyl-2-acetamidopropane-1,3-diol by the reduction of (dl)-p-nitro-α-acetamido-β-hydroxypropiophenone with aluminum isopropylate in anhydrous isopropanol, the improvement which comprises carrying out the reduction in the presence of 0.05 to 0.2 mole of aluminum chloride for each mole of the (dl)-p-nitro-α-acetamido-β-hydroxypropiophenone to be reduced.

9. In a process for the production of DL-threo-1-p-nitrophenyl-2-acetamidopropane-1,3-diol by the reduction of (dl)-p-nitro-α-acetamido-β-hydroxypropiophenone with aluminum isopropylate in anhydrous isopropanol, the improvement which comprises carrying out the reduction in the presence of 0.05 to 0.2 mole of aluminum bromide for each mole of the (dl)-p-nitro-α-acetamido-β-hydroxypropiophenone to be reduced.

10. In a process for the production of DL-threo - 1-p-nitrophenyl-2-dichloroacetamidopropane-1,3-diol by the reduction of (dl)-p-nitro-α-dichloroacetamido - β - hydroxypropiophenone with aluminum isopropylate in anhydrous isopropanol, the improvement which comprises carrying out the reduction in the presence of 0.05 to 0.2 mole of aluminum chloride for each mole of the (dl)-p-nitro-α-dichloroacetamido-β-hydroxypropiophenone to be reduced.

No references cited.